(12) United States Patent
Fiegert et al.

(10) Patent No.: US 7,696,894 B2
(45) Date of Patent: Apr. 13, 2010

(54) METHOD FOR DETERMINING A RELATIVE POSITION OF A MOBILE UNIT BY COMPARING SCANS OF AN ENVIRONMENT AND MOBILE UNIT

(75) Inventors: Michael Fiegert, Munich (DE); Martin Soika, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 819 days.

(21) Appl. No.: 11/495,560

(22) Filed: Jul. 31, 2006

(65) Prior Publication Data

US 2007/0026872 A1 Feb. 1, 2007

(30) Foreign Application Priority Data

Jul. 29, 2005 (DE) ........................ 10 2005 035 746

(51) Int. Cl.
*G08B 21/00* (2006.01)
(52) U.S. Cl. ...................... 340/686.1; 701/23
(58) Field of Classification Search ............... 340/686.1
See application file for complete search history.

(56) References Cited

U.S. PATENT DOCUMENTS

| | | | | |
|---|---|---|---|---|
| 4,951,214 A | * | 8/1990 | Hollister | 701/300 |
| 5,202,661 A | * | 4/1993 | Everett et al. | 340/522 |
| 5,311,173 A | * | 5/1994 | Komura et al. | 340/995.22 |
| 5,680,313 A | * | 10/1997 | Whittaker et al. | 701/300 |
| 7,030,780 B2 | * | 4/2006 | Shiomi et al. | 340/961 |

OTHER PUBLICATIONS

Rofer, Using Histogram Correlation to Create Consistent Laser Scan Maps, 2002, IEEE, Proceedings of the 2002 IEEE/RSJ, pp. 625-630.*
Adachi, Memory-Based Navigation using Data Sequence of Laser Range Finder, 2003, IEEE, Proceedings 2003 International Symposium on Computational Intelligence in Robotics and Automation, pp. 479-484.*
Bengtsson, Localization in Changing Environments by Matching Laser Range Scans, 1999, IEEE, pp. 169-176.*
Tomono, A Scan Matching Method using Euclidean Invariant Signature for Global Localization and Map Building, 2004, IEEE, Proceedings of the 2004 IEEE International Conference on Robotics and Automation, pp. 866-871.*

(Continued)

*Primary Examiner*—Daniel Wu
*Assistant Examiner*—Brian Wilson
(74) *Attorney, Agent, or Firm*—Staas & Halsey LLP (57) ABSTRACT

In the method for determining a relative position of a mobile unit by comparing scans of an environment, scans of an environment of the mobile unit are recorded continuously by a distance sensor and stored in a memory. Furthermore the processing unit compares a first scan with a second scan, with a relative position of the mobile unit at the time of the second scan being determined in relation to a position at the time of the first scan. The method is characterized by the fact that the processing unit compares the first scan iteratively with subsequent scans, with a new relative position of the mobile unit at the time of the relevant subsequent scan being determined relative to the position at the time of the first scan, and with the last relative position determined in each case being taken into account as a-priori information.

14 Claims, 4 Drawing Sheets

OTHER PUBLICATIONS

Koyasu, Integrating Multiple Scan Matching Results for Ego-Motion Estimation with Uncertainty, 2004, IEEE, Proceedings of 2004 IEEE/RSJ International Conference on Intelligent Robotics and Sytems, pp. 3104-3109.*

Gutmann, Jens Steffen, "Robuste Navigation autonomer mobiler Systeme", Dissertationen zur künstlichen Intelligenz, vol. 241, Berlin: Akademische Verlagsgesellschaft Aka GmbH, 2000, pp. 21-88.

* cited by examiner

PRIOR ART

METHOD FOR DETERMINING A RELATIVE POSITION OF A MOBILE UNIT BY COMPARING SCANS OF AN ENVIRONMENT AND MOBILE UNIT

CROSS REFERENCE TO RELATED APPLICATIONS

This application is based on and hereby claims priority to German Application No. 10 2005 035 746.6 filed on Jul. 29, 2005, the contents of which are hereby incorporated by reference.

BACKGROUND OF THE INVENTION

The invention relates to the determination of a relative position of a mobile unit by comparing scans of an environment. The mobile unit involved is for example a vehicle, such as a fork lift truck or a robot vehicle.

Figure 5:
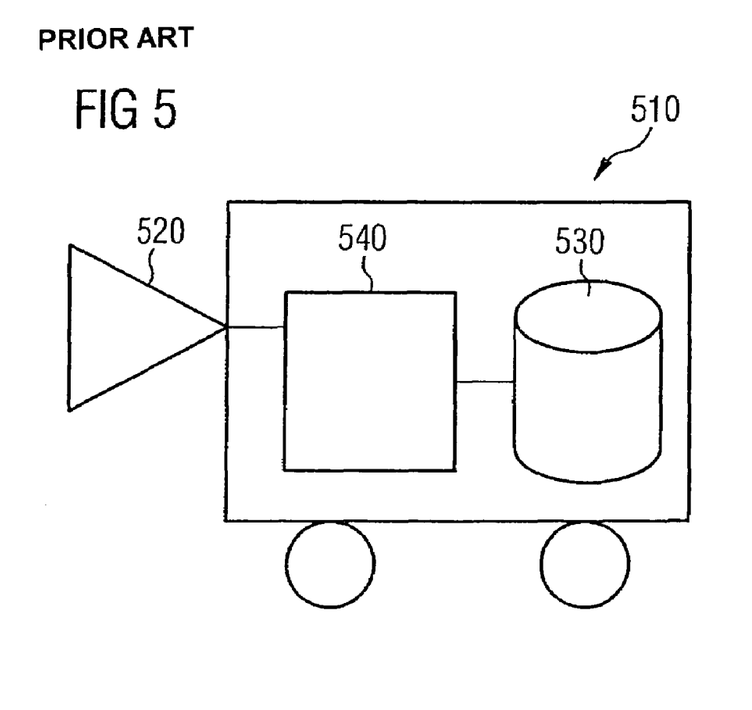
FIG. 5 a mobile unit.

FIG. 5 shows a mobile unit 510. The mobile unit 510 has a distance sensor 520, a memory 530 and also a processing unit 540. The distance sensor 520 might for example be a laser scanner or an ultrasound sensor. Comparable technologies are likewise possible.

The scans of an environment of the mobile unit 510 recorded by the distance sensor 520 are stored in the memory 530 and processed by the processing unit 540.

The characteristics of scans and methods of scan matching described below are well known to the person skilled in the art and in particular can also be found in the publication by Gutmann, Jens-Steffen entitled 'Robuste Navigation autonomer mobiler systems, Dissertationen for künstlichen Intelligenz' (robust navigation of autonomous mobile systems, dissertations on artificial intelligence), Volume 241, Berlin: Akademische Verlagsgesellschaft Aka GmbH, 2000, page 21-88.

Figure 1:
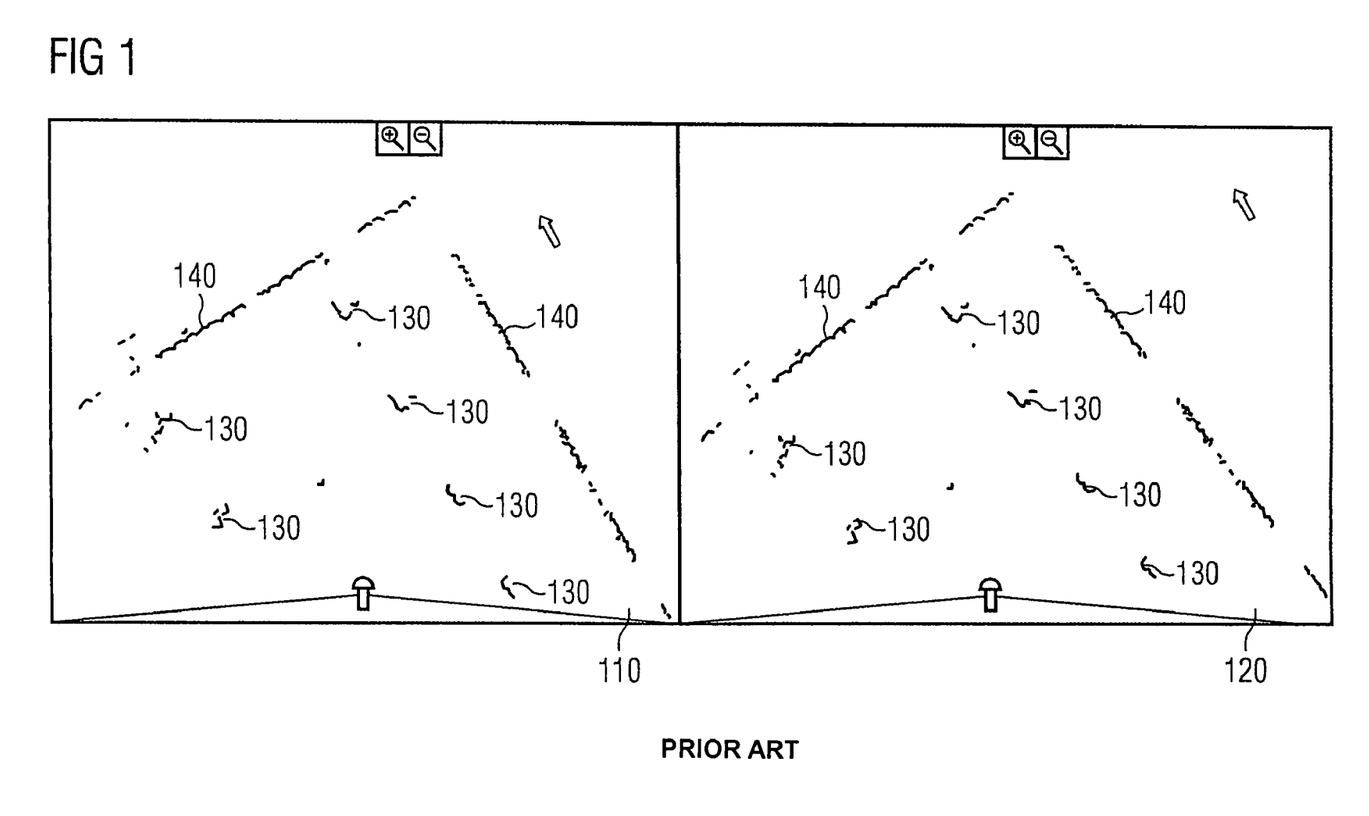
FIG. 1 two scans.

FIG. 1 shows two scans 110, 120. As is known from the related art mentioned, a scan is a geometrical two-dimensional or three-dimensional image of the environment of the mobile unit 510. The scan generally has a set of measured values which are specified as polar coordinates for example. In this case the individual measured values are referred to as scan points. The scan points can be converted into absolute Cartesian coordinates. This type of representation in Cartesian coordinates is shown in FIG. 1 for the scans 110 and 120. Pillars 130 and walls 140 respectively can be recognized in the scans 110, 120.

Scan matching means rotating and moving a scan so that a maximum overlap with for example a second scan is produced. In the case shown in FIG. 1, the scan 120 has had to be rotated slightly in a clockwise direction to obtain a maximum overlap with the scan 110.

After the rotation and movement of scan 120 has been determined, a relative position can thus be deduced which describes the relative position and orientation of the mobile unit 510 at the time of the scan 120 in relation to the time of the scan 110. In this way a local orientation for the mobile unit 510 can be enabled by ongoing scan matching.

Figure 2:
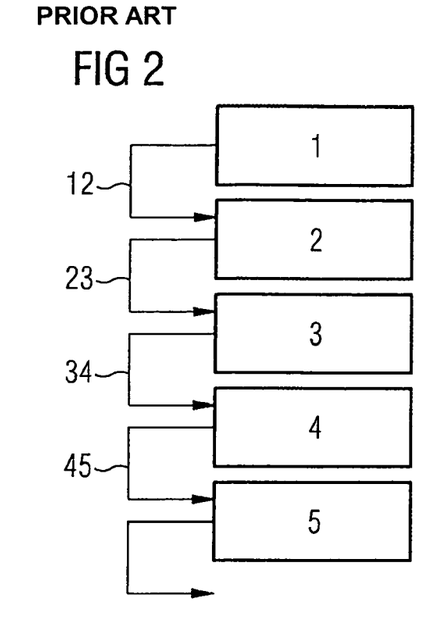
FIG. 2 a scan matching method according to the related art.

FIG. 2 shows a processing of scans according to the related art. Within the context of scan matching undertaken here, a first scan 1 can be subjected to a comparison 12 with a second scan 2. The comparison 12 is made in this case using a known scan matching method. From the comparison 12 a relative position of the mobile unit 510 at the time of the second scan 2 in relation to the position at the time of the first scan 1 is determined. In practice this means a change of location and orientation. Subsequently the second scan 2 is subjected to a comparison 23 with a subsequent scan 3. In this case a relative position of the mobile unit 510 at the time of the subsequent scan 3 in relation to the position at the time of the second scan 2 is determined. In the same way comparisons 34, 45 of the subsequent scans 3, 4, 5 are undertaken. This method is very imprecise, since errors are accumulated with each comparison.

Because of these imprecisions wheel sensors are normally used in the methods known from the related art as a basis for determining the relative position, in order to determine a speed of the mobile unit 510 from wheel revolutions per unit of time and also an angular speed of the mobile unit 510 from a different speed of the wheels on the left and right. As an alternative or in addition an infrastructure is often used, which might for example have recourse to GPS satellites, reflective strips or magnets for determining the relative position. Furthermore a map is frequently used with which the current sensor measurements are reconciled.

Further methods are known from the related art, which use this information as a basis for determining the relative position of a mobile unit by comparing scans of the environment. Such methods for determining a relative position always require additional information from other sensors however, such as an odometry, which will be qualitatively improved by the relevant method.

The relative movements calculated from scan matching are also used in the related art to improve the accuracy of wheel-based odometry for example.

The disadvantage of the methods given is the fact that wheel sensors are expensive, if for example they have to be retrofitted, and that alternatives such as infrastructure or map data are often not available at all or only available for some of the time. Furthermore the known methods are frequently too imprecise. With scan matching in particular too many errors are accumulated. Although methods are known which can minimize the errors in the scan matching these methods have quadratic complexity, which means that they can only be used for orientation offline, not while the mobile unit is moving.

SUMMARY OF THE INVENTION

The object is thus to specify a method for determining a relative position of a mobile unit by a comparison of scans of an environment which achieves high accuracy and efficient processing.

In the method for determining a relative position of a mobile unit by comparing scans of an environment, scans of an environment of the mobile unit are recorded continuously by a distance sensor and stored in a memory. Furthermore the processing unit compares a first scan with a second scan, with a relative position of the mobile unit at the time of the second scan being determined in relation to a position at the time of the first scan. The method is characterized in that the processing unit compares the first scan iteratively with the subsequent scans, with a new relative position of the mobile unit at the time of the relevant subsequent scan being determined in relation to a position at the time of the first scan, and with the last relative position determined in each case being taken into account as a-priori information.

The mobile unit is configured to execute said method.

The computer program executes said method when it is run in a processor.

A computer program which executes said method when it is run in a processor is stored on the computer-readable data medium.

By taking into account the last relative position determined in each case as a-priori information, use can be made of the fact that, with sufficient overlap of the individual scans in conjunction with the a-priori position estimation from other comparisons, an inaccuracy of a current comparison does not increase even for longer periods. The advantage over the related art in this case is that, in the related art, consecutive comparisons of scans rapidly produce inaccuracies in the determination of the relative position and make the result unusable. By taking into account the last relative position determined in each case as a-priori information it is in fact possible for the first time to compare efficiently and reliably scans taken a long time apart and thereby to determine a precise relative position.

The method does not require any infrastructure such as GPS satellites, reflecting strips or magnets nor does it require a map of the environment. It is thus immediately ready for use without any installation effort and can also operate in changing environments, such as a warehouse. The method achieves such a high level of accuracy that odometry data can be dispensed with. Thus no expensive upgrading of wheel sensors is necessary. The high accuracy of the method solely through scan matching also provides a decisive advantage if said additional sensor information or map data has been provided but is incomplete or is temporarily not available.

In accordance with a development the processing unit compares one of the subsequent scans with the first scan and with at least one further scan with provisional relative positions being determined in each case. With the aid of a correction filter the processing unit then computes a corrected relative position from the provisional relative positions.

This development makes use of the fact that each relative movement can be computed from different chains of scan pairs. By reconciling the provisional relative positions errors can be detected, reduced, sorted out or averaged out.

In accordance with one embodiment the distance sensor is a laser scanner.

Other distance sensors such as ultrasound for example are also conceivable. The outstanding features of laser scanners are their particularly high accuracy and reliability.

In a further development the correction filter calculates the corrected relative position by averaging the provisional relative positions.

This further development is of advantage if the provisional relative positions are similar to one another.

In a particular further development the provisional relative positions each specify a probability distribution about the position of the mobile unit. Such a probability distribution can in the case of a normal distribution be represented by an ellipsoid and can be averaged by a Kalman filter.

This is particularly of advantage if the scan matching produces uncertainties, for example in the form of a covariance matrix.

In another development at least three provisional relative positions are determined, after which the correction filter only takes account of those provisional relative positions which are equivalent to each other or similar to each other.

This makes it possible to discard provisional relative positions which contain a large error.

In accordance with one embodiment, on the basis of the a-priori information in the memory, a search is made for an earlier scan with an earlier position which is similar to the assumed current position of the mobile unit based on the a-priori information. Subsequently the earlier scan is compared with a current scan. The current position is recognized again as the earlier position if a match between the earlier scan and the actual scan determined by the comparison exceeds a predetermined threshold.

This embodiment offers the advantage that the compared scans can be far apart in time. The comparison can be undertaken over several hundred scans. A plurality of earlier scans can also be sought and compared to the current scan.

In accordance with a further embodiment additional absolute position information is taken into account as a-priori information.

In this case the requirements relating to the accuracy and availability of the absolute location information can be reduced. This reduces the expense of providing an infrastructure or map data.

In a further development the method is applied iteratively, whereby different chains of scan pairs are compared.

The iteration offers the advantage of the applying the method on an ongoing basis without errors accumulating.

In a further embodiment the method is applied online while the mobile unit is on the move, with the latest scan always being compared.

This embodiment makes it possible to determine the relative position in real time which enables the mobile unit to orient itself at run time.

In a further development the method starts again as soon as a coverage of the last compared subsequent scan with the first scan falls below a predetermined threshold value, an error value determined in the comparison exceeds a predetermined threshold value or a distance between the positions of the mobile unit at the time of the first scan and of the subsequent scan exceeds a range of the distance sensor. Instead of the first scan the subsequent scan is used as a basis for the following comparisons.

In a particular embodiment the processing unit selects at least one method in accordance with the further developments and embodiments given and executes it. Only methods which can be executed with currently available processing resources are selected.

This offers the advantage that the available processing resources can be used to the optimum extent. The stated developments of the method are optionally executed in order to increase the accuracy of the determination of the relative position.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIGS. 1, 2 and 5 have already been explained in the discussion of the related art.

Figure 3:
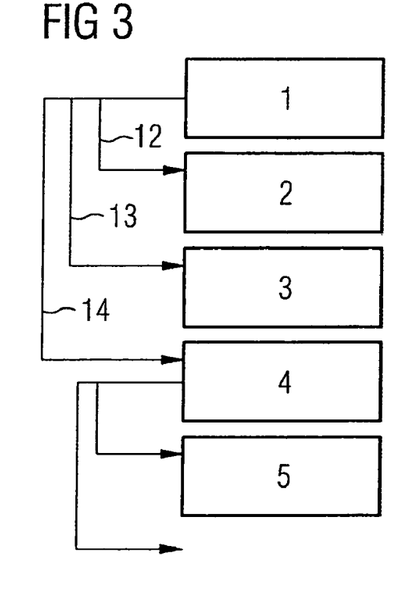
FIG. 3 a scan matching method with a-priori position estimation.

FIG. 3 shows an exemplary embodiment. Here a first scan 1 is subjected to a comparison 12 with a second scan 2. In this case a relative position of the mobile unit 510 (cf. FIG. 5) at the time of the second scan 2 is determined in relation to the position at the time of the first scan 1. The relative position determined is stored as an intermediate result in the memory 530 (cf. FIG. 5). Subsequently the first scan 1 is again subjected to a comparison, but this time with a subsequent scan 3. In this case the last relative position determined stored as the intermediate result is taken into account as a-priori information.

How such information can be taken into account is well known from the related art. By making the search area smaller or reducing the amount of data, ambiguities are eliminated and the efficiency of the method is increased. Only those relative positions which are at all possible, taking into account the a-priori information, need to be taken into consideration for scan matching. Furthermore a projection filter can be used to remove that scan points from the first scan 1 which in accordance with the other a-priori information of the last relative position determined are likely to be covered in the subsequent scan 3 or cannot lie in the recording area of the subsequent scan 3.

In a next step the first scan 1 is subjected to a comparison 14 with a subsequent scan 4. In this step the last relative position determined, in this case that position which was determined in the comparison 13, is again taken into account as a-priori information. The a-priori information thus represents a way for position estimation which significantly improves the quality and efficiency of the scan matching. As shown in FIG. 3, a new series of scan comparisons can now begin, using the subsequent scan 4 as its starting point for example. In this manner the method can be iterated to enable it to be applied continuously, especially during the run time during the movement of the mobile unit 510.

Figure 4:
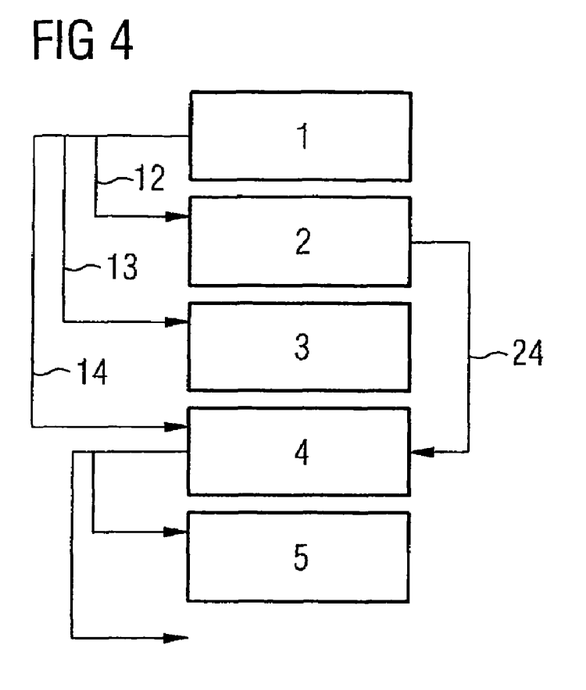
FIG. 4 a scan matching method with different chains of scan pairs.

FIG. 4 shows a further exemplary embodiment. Here the first scan 1, the second scan 2 and also the subsequent scans 3, 4, 5 are subjected to comparisons 12, 13, 14 as in the previous exemplary embodiment. In addition however a comparison 24 of the second scan 2 with the subsequent scan 4 is undertaken. The relative positions determined to in the comparisons 14 and 24 are considered in this case as provisional relative positions. With the aid of a correction filter a corrected relative position is subsequently calculated from the provisional relative positions.

For example the correction filter can average the two provisional relative positions. The average value allows errors to be reduced. Further pairs of scans can also be formed and compared which makes additional provisional relative positions available for the averaging.

Within the context of the scan matching uncertainties are frequently also provided which for example can be represented as a covariance matrix. A probability distribution covering the position of the mobile unit 510 can in the case of a normal distribution in Cartesian co-ordinates be represented as an ellipsoid. These ellipsoids can for example be computed with one another and averaged using a Kalman filter. Depending on the type of the probability distribution other filters can also be selected, such as an extended Kalman filter.

Figure 6:
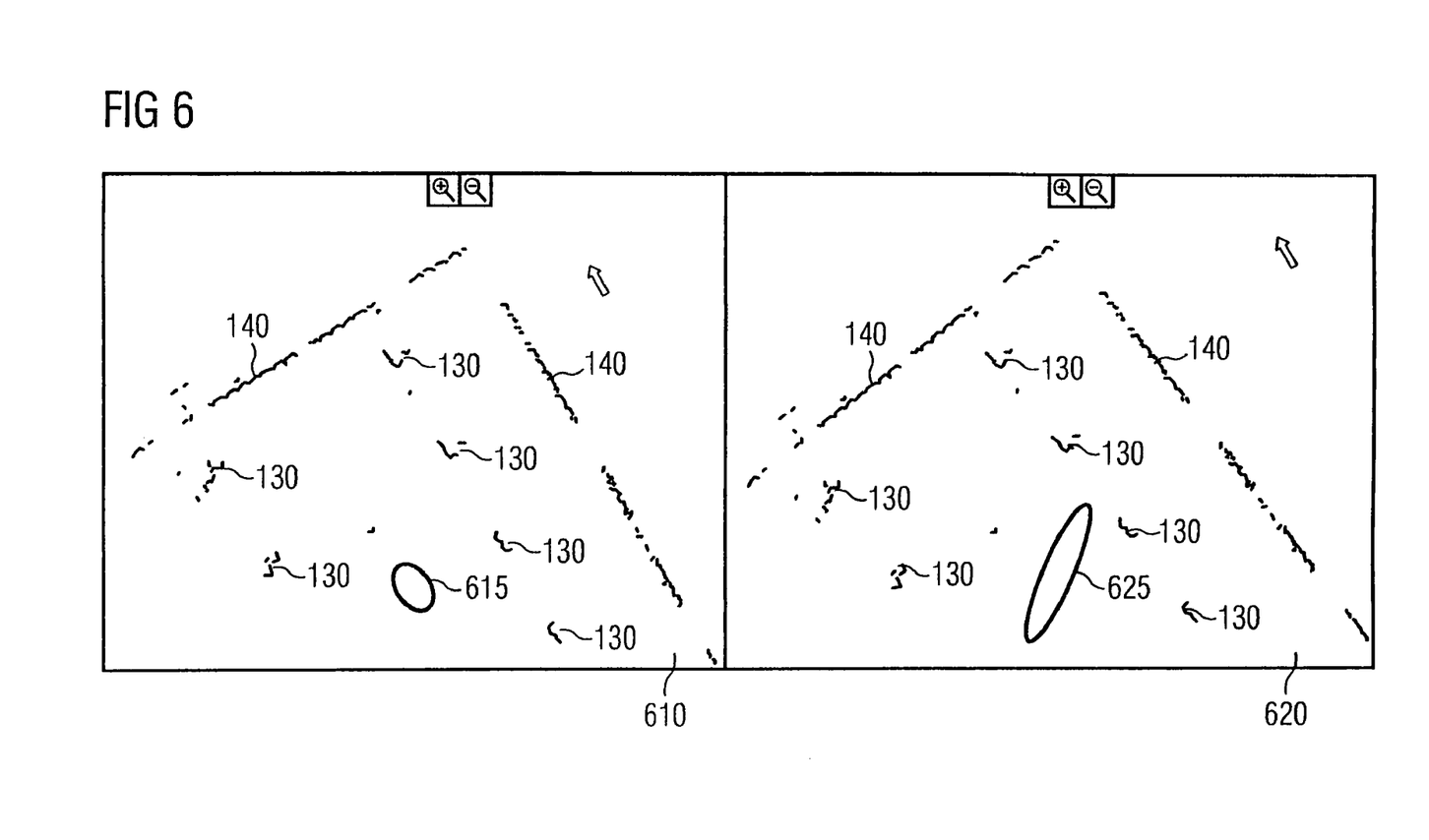
FIG. 6 two scans with ellipsoids.

FIG. 6 shows scans 610 and 620 in Cartesian coordinates with walls 140 and pillars 130. In this case ellipsoids 615 and 625 are drawn in which each specify a probability distribution relating to the position of the mobile unit 510, as can be determined within the context of the scan matching method for the relative position.

In an alternative exemplary embodiment at least three provisional relative positions are formed from different pairs and scans and the relevant comparison. In addition to the comparison 14 and 24 shown in FIG. 4, the first scan 1 could also be compared with the subsequent scan 4 for example. For determining the relative positions of the mobile unit 510 at the time of the subsequent scan 4, there are thus three provisional relative positions available. If one of these provisional relative positions now differs markedly from the other two, it can be assumed that the corresponding comparison has been subject to an error. In this case the corresponding provisional relative position is discarded so that the correction filter only takes account of the two other provisional relative positions. A corrected relative position can now be calculated by for example averaging the remaining provisional relative positions with each other.

The method can also decide for itself on the basis of the match or the deviation between the provisional relative positions whether these are to be averaged or discarded.

By comparing two scans far apart from each other in time it is possible for the mobile unit 510 to detect once again a location already visited. If the mobile unit 510 finds itself at the same position again as at the time of an earlier scan, a comparison with a current scan will provide an especially close match. To this end, on the basis of the a-priori information in memory 530, a search is made for an earlier scan with an earlier position which is similar to the supposed current position of the mobile unit 510 on the basis of the a-priori information. The earlier scan is then compared to the current scan. If the match exceeds a predetermined threshold value the old position is recognized again.

In addition to the relative position determination described, absolute position information can also be fed to the method within the context of the a-priori information. The absolute position information can for example be provided through an infrastructure (GPS satellite, reflecting strips, magnets . . . ) or a map.

In accordance with one exemplary embodiment the scan matching is applied iteratively in a continuous manner, whereby different chains of scan pairs are compared. This is indicated in FIG. 4 since the subsequent scan 4 now provides the basis for further comparisons with subsequent scans 5. The ongoing application of scan matching enables the method to also be employed online while the mobile unit 510 is on the move, in which case the most current scan of the environment of the mobile unit 510 always participates in the comparison and the current relative position of the mobile unit 510 is determined for its orientation.

Through the formation of chains of scan pairs which are compared, the scan matching method achieves a low algorithmic complexity since the number of necessary comparisons is kept small. This if makes it possible to employ the method online while the mobile unit 510 is moving. If on the other hand one wished to compare all scans with each other, a corresponding algorithm would have quadratic complexity, meaning of that it would only be possible to use it offline.

As shown in FIGS. 3 and 4 the method starts again as soon as a coverage of the last compared subsequent scan 4 with the first scan 1 falls below a predetermined threshold, an error value determined during the comparison exceeds a predetermined threshold or a distance between the positions of the mobile unit 510 at the time of the first scan 1 and the following scan 4 exceeds a range of the distance sensor 520. Instead of the first scan 1 the subsequent scan 4 is used as a basis for the subsequent comparisons.

Depending on the currently available processing resources the processing unit 540 can include or exclude the individual variants from the exemplary embodiments described in order to compute the relative position with the best possible precision and still in real time.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A method for determining a relative position of a mobile unit, comprising:
   continuously recording scans of an environment of the mobile unit using a distance sensor;
   storing the scans in a memory;
   using a processing unit, comparing a first scan with a second scan;
   determining a relative position of the mobile unit at a time of the second scan in relation to a position of the mobile unit at a time of the first scan;
   iteratively comparing the first scan with subsequent scans to determine a new relative position of the mobile unit at a time of the relevant subsequent scan in relation to the position of the mobile unit at the time of the first scan; and
   evaluating the relative position of the mobile unit at the time of a current scan using an immediately preceding relative position as a-priori information.

2. The method as claimed in claim 1, wherein
   the processing unit compares each subsequent scan with the first scan and at least one further scan to respectively determine first and further relative positions, and
   the processing unit computes a corrected relative position from the first and further relative positions with the aid of a correction filter.

3. The method as claimed in claim 1,
   wherein the distance sensor is a laser scanner.

4. The method as claimed in claim 2,
   wherein the correction filter computes the corrected relative position by averaging the first and further relative positions.

5. The method as claimed in claim 4,
   wherein the first and further relative positions each specify a probability distribution about the position of the mobile unit.

6. The method as claimed in claim 2,
   wherein at least three relative positions are determined respectively using at least three different prior scans, and
   the correction filter only takes account of those relative positions which are equivalent to each other or are similar.

7. The method as claimed in claim 1, wherein
   on the basis of the a-priori information in the memory a search is made for an earlier scan with an earlier position which is similar to an assumed current position produced from a current scan,
   the earlier scan is compared with the current scan, and
   the earlier position is accepted as the current position if a similarity between the earlier scan and the current scan exceeds a predetermined threshold value.

8. The method as claimed in claim 1, wherein absolute position information is additionally taken into account as a-priori information.

9. The method as claimed in claim 2, wherein
   the processing unit iteratively compares different chains of scan pairs.

10. The method as claimed in claim 1, wherein
    the method is applied online while the mobile unit is on the move, and
    the relative position at the time of each current scan is compared with the immediately preceding relative position to.

11. The method as claimed in claim 1, wherein
    the relative position at the time of each current scan is compared with the immediately preceding relative position to determine an error value,
    a restart is performed as soon as the error value exceeds a predetermined threshold value or as soon as a distance between the position of the mobile unit at the time of the first scan and the position of the mobile unit at the time of the current scan exceeds a range of the distance sensor, and
    when the restart is performed, instead of iteratively comparing the first scan with subsequent scans, the current scan is iteratively compared with subsequent scans.

12. The method as claimed in claim 1, wherein the processing unit selects and executes the following methods at different times depending on the resources available and the position determining needs:
    a first method wherein
       the processing unit compares each subsequent scan with the first scan and at least one further scan to respectively determine first and further relative positions,
       the processing unit computes a corrected relative position from the first and further relative positions with the aid of a correction filter, and
       the correction filter computes the corrected relative position by averaging the first and further relative positions;
    a second method wherein
       the processing unit compares each subsequent scan with the first scan and at least two other scans to determine three relative positions, and
       the correction filter only considers those relative positions that are substantially the same
    a third method wherein
       on the basis of the a-priori information in the memory a search is made for an earlier scan with an earlier position which is similar to an assumed current position produced from a current scan,
       the earlier scan is compared with the current scan, and
       the earlier position is accepted as the current position if a similarity between the earlier scan and the current scan exceeds a predetermined threshold value; and
    a fourth method wherein
       the relative position at the time of each current scan is compared with the immediately preceding relative position to determine an error value,
       a restart is performed as soon as the error value exceeds a predetermined threshold value or as soon as a distance between the position of the mobile unit at the time of the first scan and the position of the mobile unit at the time of the current scan exceeds a range of the distance sensor, and
       when the restart is performed, instead of iteratively comparing the first scan with subsequent scans, the current scan is iteratively compared with subsequent scans.

13. A mobile unit for determining the relative position of the mobile unit comprising a distance sensor, a memory, and a processing unit, which is configured to execute a method in claim 1.

14. A computer-readable medium storing a program for controlling a computer to perform a method determining a relative position of a mobile unit, the method comprising:

continuously recording scans of an environment of the mobile unit using a distance sensor;

storing the scans in a memory;

using a processing unit, comparing a first scan with a second scan;

determining a relative position of the mobile unit at a time of the second scan in relation to a position of the mobile unit at a time of the first scan;

iteratively comparing the first scan with subsequent scans to determine a new relative position of the mobile unit at a time of the relevant subsequent scan in relation to the position of the mobile unit at the time of the first scan; and evaluating the relative position of the mobile unit at the time of a current scan using an immediately preceding relative position as a-priori information.

* * * * *